United States Patent [19]

Linder

[11] Patent Number: 5,425,552
[45] Date of Patent: Jun. 20, 1995

[54] VEHICLE AIRBAG AND METHOD OF FOLDING SAME

[75] Inventor: Leo Linder, Vöhringen, Germany

[73] Assignee: Dr. Ing. H.C.F. Porsche AG, Germany

[21] Appl. No.: 235,648

[22] Filed: Apr. 29, 1994

[30] Foreign Application Priority Data

Apr. 30, 1993 [DE] Germany ............ 43 14 207.9

[51] Int. Cl.6 ................................................ B60R 21/16
[52] U.S. Cl. ............................................. 280/743.1
[58] Field of Search .......... 280/730, 731, 732, 743 R

[56] References Cited

U.S. PATENT DOCUMENTS

| | | | |
|---|---|---|---|
| 4,004,828 | 1/1977 | Sogabe et al. | 280/743 R |
| 4,235,453 | 11/1980 | Lawson et al. | 280/743 R |
| 4,351,544 | 9/1982 | Ross | 280/743 R |
| 4,884,823 | 12/1989 | Honda | 280/731 |
| 5,324,070 | 6/1994 | Kitagawa et al. | 280/730 R |

FOREIGN PATENT DOCUMENTS 2536933 3/1976 Germany .

*Primary Examiner*—Kenneth R. Rice
*Attorney, Agent, or Firm*—Evenson, McKeown, Edwards & Lenahan

[57] ABSTRACT

A process is provided for folding an airbag into a stowage shape which is adapted to a trapezoid housing. The airbag is first folded into an elongated shape with parallel sides, and folded again to further reduce its size to a rectangular shape. Points are then formed by first and second diagonal folds, the points being positioned adjacent recesses in airbag housing into which they are then fitted.

7 Claims, 5 Drawing Sheets

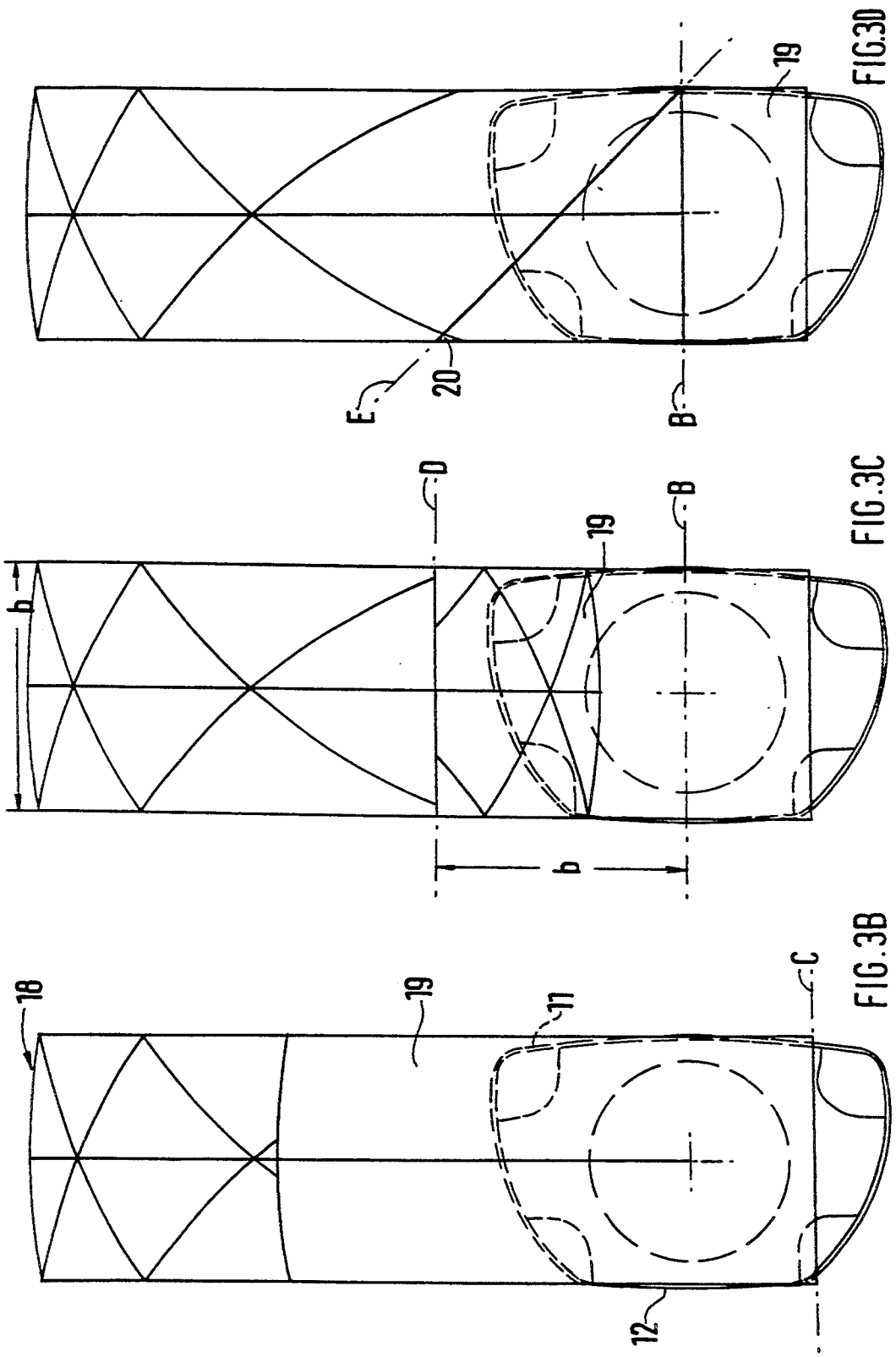

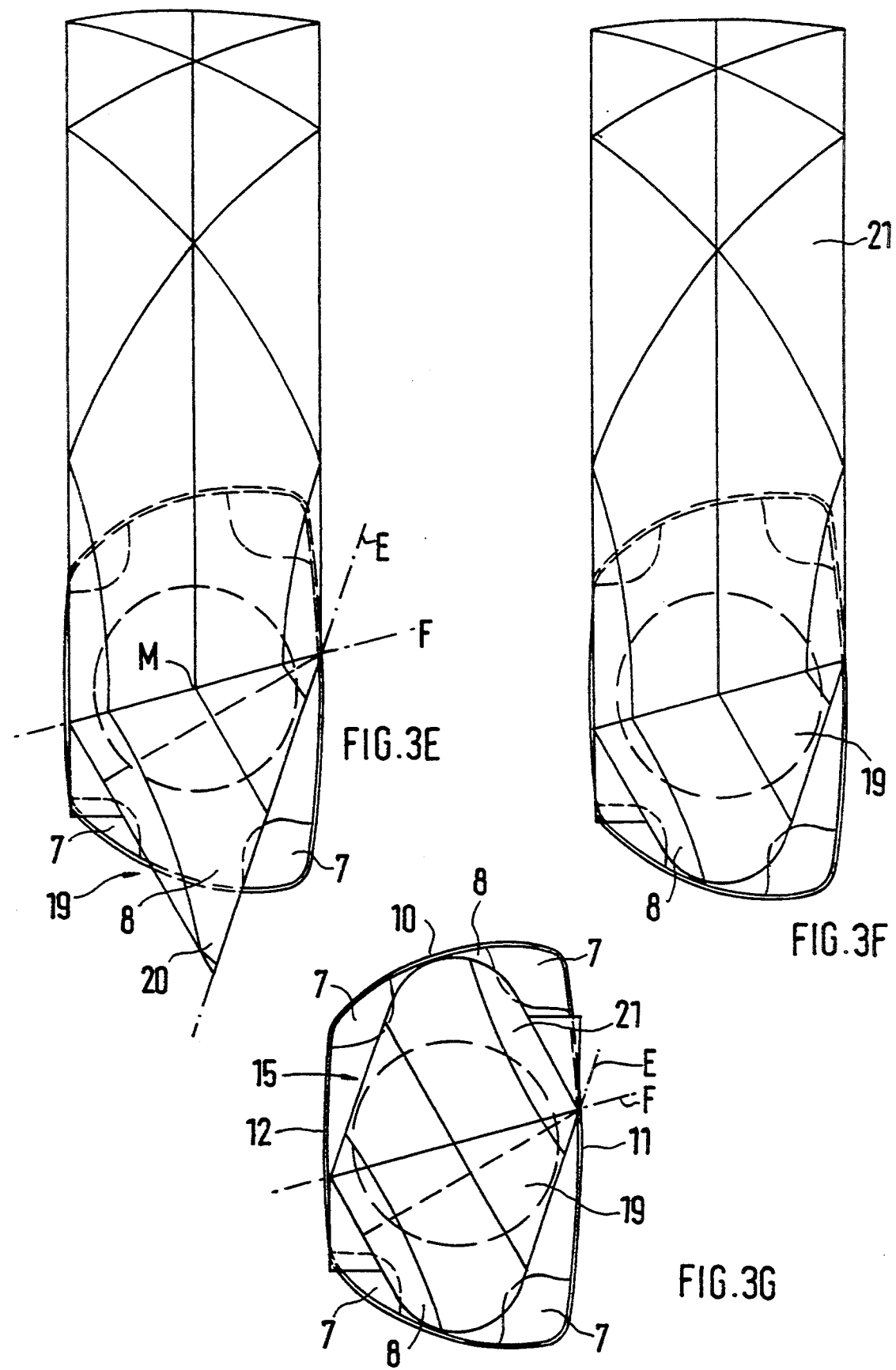

VEHICLE AIRBAG AND METHOD OF FOLDING SAME

BACKGROUND AND SUMMARY OF THE INVENTION

This invention relates to a process for folding an airbag used as an impact protection device in a vehicle. Until it is operated, the airbag is stowed together with an inflating device (normally an air generator) in a tub-shaped housing which is accommodated, for example, in a steering wheel of a vehicle.

Processes for folding the airbag to accommodate it in such housings are known. For example, in the so-called rolling fold, the airbag, which is cut essentially to a round shape, is first folded into an elongated shape with parallel sides and the free ends are then folded back to produce an essentially rectangular package.

Steering wheels used to accommodate such an airbag, on the other hand, generally have a so-called "four-spoke shape"; that is, four spokes extend from an outer steering wheel rim to an impact body with diagonally extending walls. In order to fit an airbag folded by the above described process (which forms a rectangular stowage shape) into such an impact body it has been necessary either to fold the airbag into such a small size that it does not protrude beyond the housing walls of the impact body, or to fold it so that it projects slightly beyond the diagonally extending housing walls of the impact body, and must be stuffed at these points during the mounting of a housing cover.

It is therefore an object of the present invention to provide an airbag, and a process of folding an airbag, which provide a stowage shape adapted to a tub-shaped housing.

This object is achieved by the airbag arrangement according to the invention, in which the airbag is first folded into an elongated shape with parallel sides in the same manner previously described, and then further reduced in size by folding it to form a rectangular shape. Next, it is folded diagonally, forming points, which by further diagonal folding come to be situated adjacent recesses into which they are then fitted from the direction of the previous folding plane. The reduction of the packing measurements by the utilization of such recesses is particularly advantageous and decreases the extension of the airbag out of the housing. Also, in comparison to known embodiments, one less packing layer is created, so that the housing can be more compact, and take up less installation space. It can also be designed with greater freedom as to its shape.

In the airbag arrangement according to the invention, the airbag can be packed into a trapezoidal housing in a simple manner, and disposed with an improved utilization of space and therefore in a very flat fashion.

All embodiments of the invention have in common that the tear seams arranged in the housing cover are less stressed in the stowed condition because the airbag is folded together very uniformly and exerts a uniform pressure on the housing cover.

Other objects, advantages and novel features of the present invention will become apparent from the following detailed description of the invention when considered in conjunction with the accompanying drawings.

BRIEF DESCRIPTION OF THE DRAWINGS

FIGS. 3A to 3G show a folding diagram for the folding of the airbag according to the invention.

DETAILED DESCRIPTION OF THE DRAWINGS

Figure 1:
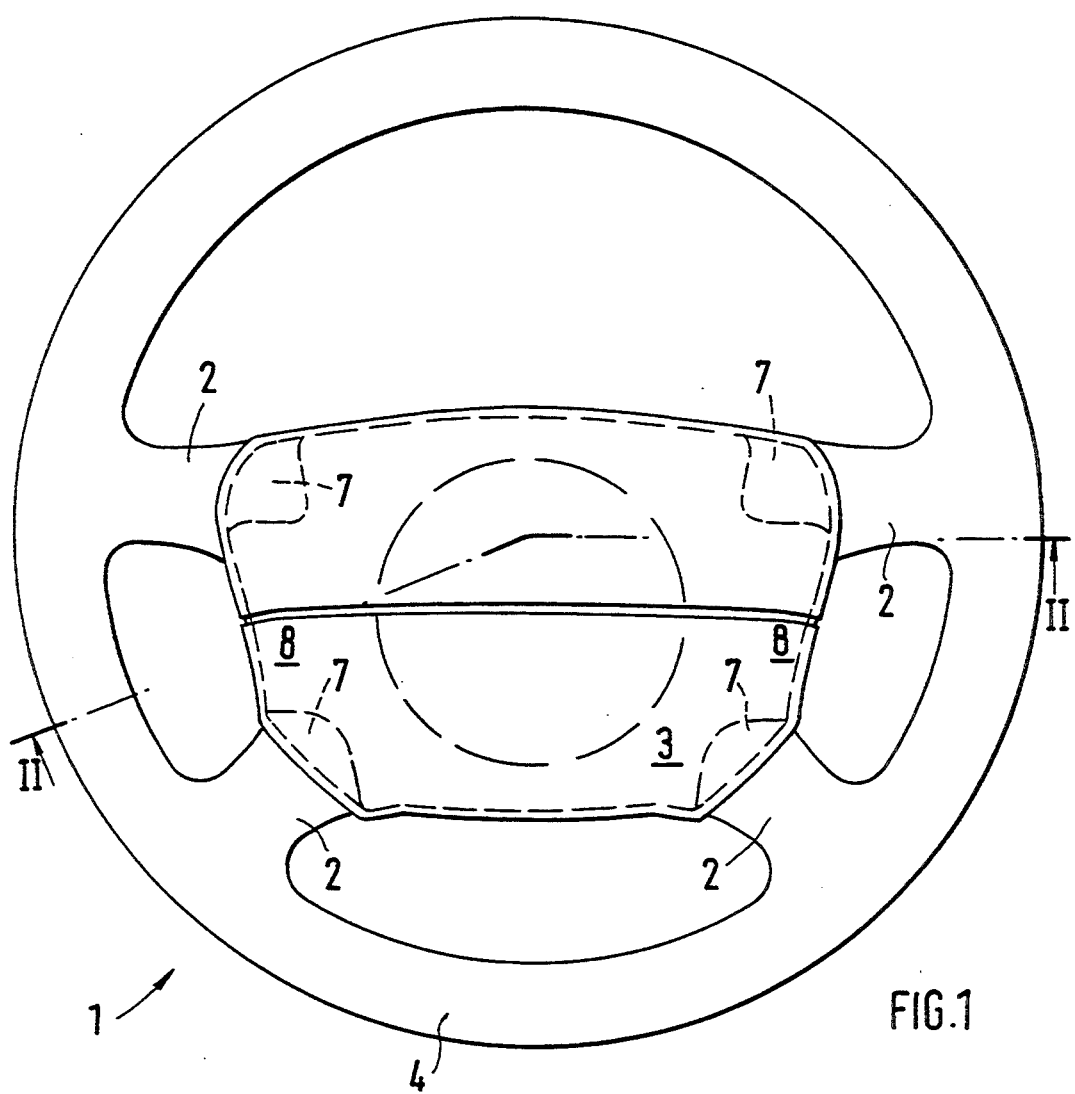
FIG. 1 is a view of a steering wheel of a vehicle comprising a housing for accommodating an airbag.
Figure 2:
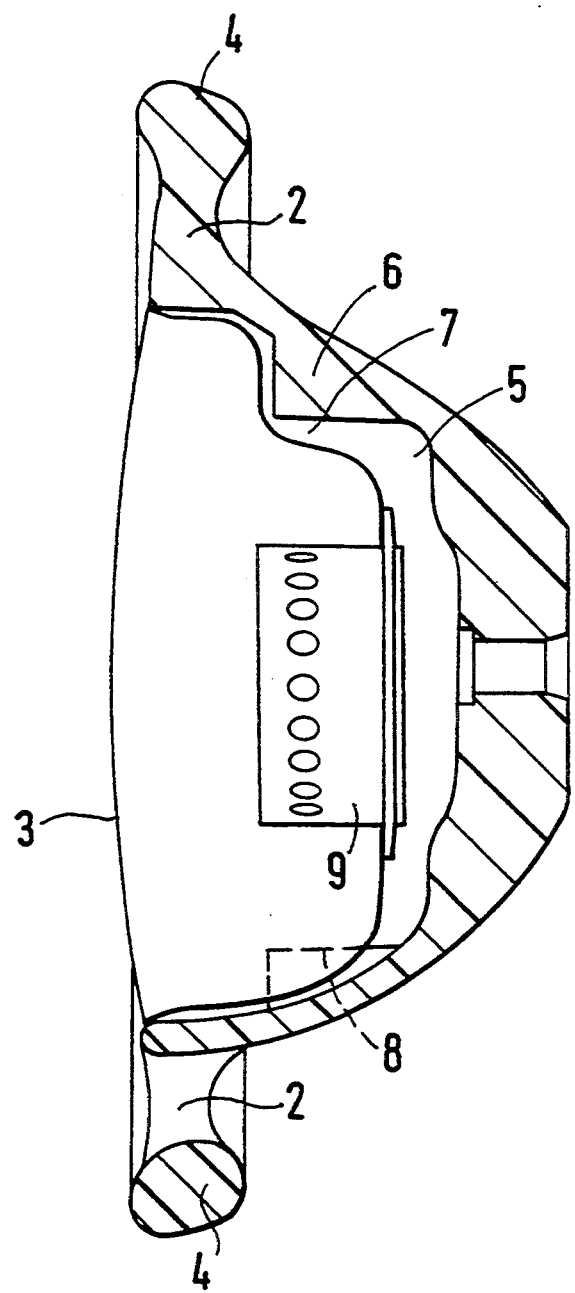
FIG. 2 is a sectional view according along line II—II of the housing in FIG. 1.

Referring to FIG. 1, there is shown a steering wheel, which has four spokes 2 extending from a central impact body 3 radially outward to a steering wheel rim 4. In FIG. 2, which is a cross-sectional view along line II—II of FIG. 1, the upper portion shows a sectional view of a spoke 2, while the lower portion is a sectional view between two spokes 2. The impact body 3 is disposed in a cavity 6 of the steering wheel 1 which has projections 6 in the area of the spokes 2 for fastening the impact body 3 (not shown in detail). The impact body 3 therefore has recesses 7 that correspond to the projections 6 (see also FIG. 1). Between the recesses 7 (and therefore between the spokes 2), two recesses 8 are formed which are bounded toward the interior by the gas generator 9 arranged in the center in the impact body 3.

A tub-shaped housing 10 of the impact body 3 is illustrated by an interrupted line in FIG. 3. The housing 10 is approximately trapezoidal and has two parallel housing walls, specifically a long side 11 and a short side 12. The parallel housing walls 11, 12 are connected with one another by means of two diagonally extending housing walls 13, 14. It is understood that the geometric description of the housing 10 is only an approximation. Thus, in the embodiment, the housing walls 11 to 14 do not have a straight but a curved construction.

Figure 3A:
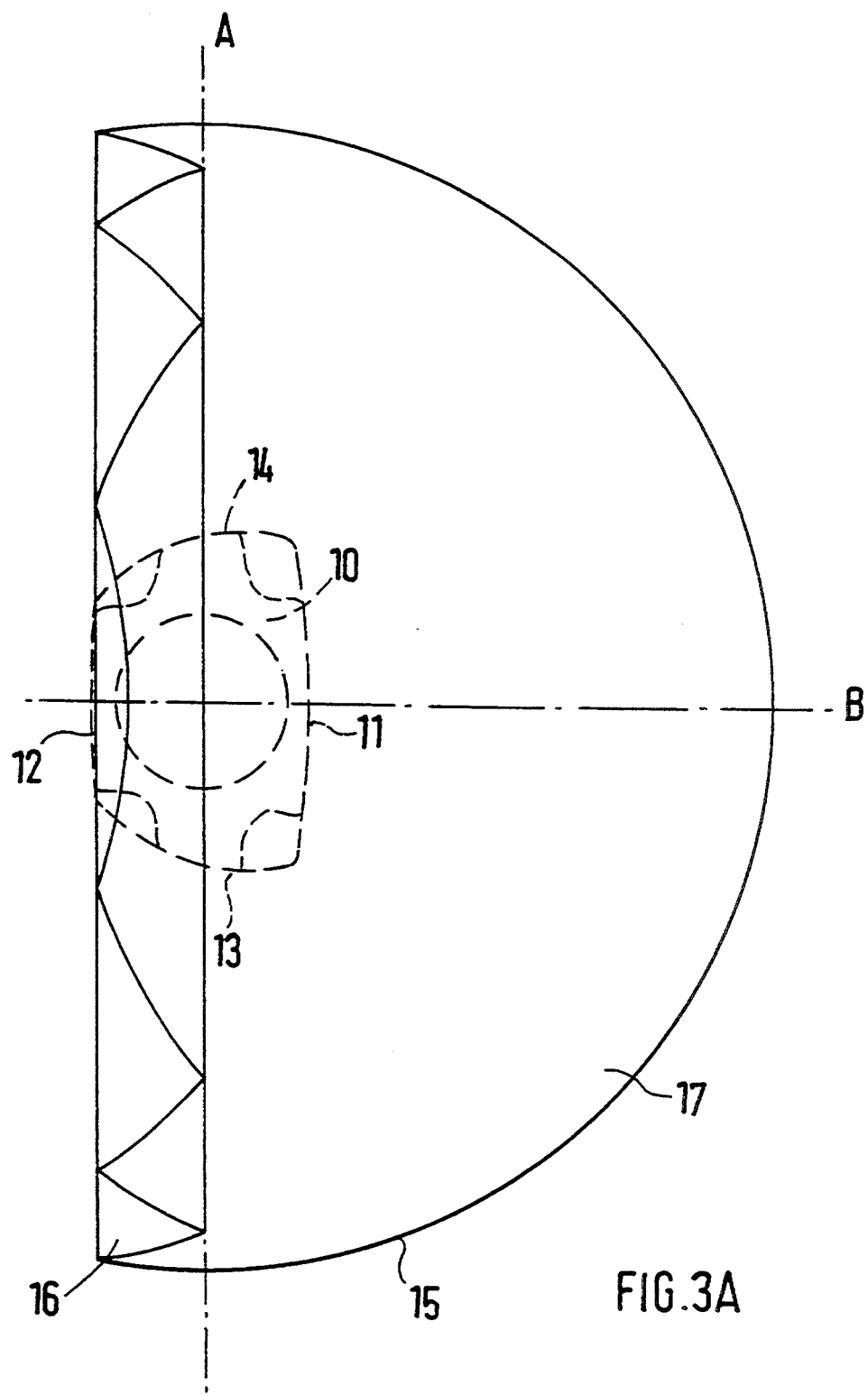

When laid out flat, an airbag 15, which is held in the housing 10 forms a circular disk which is situated concentrically to the gas generator 9. For stowage in the housing 10, each half of this circular disk is first folded toward the center in a zigzagging or accordion shape, thus forming two parallel strips bounded, on the one hand, by the parallel housing walls 11, 12 and, on the other hand, by the first center line of the housing A which also extends in parallel to the housing walls 11, 12. (FIG. 3A shows the left portion 16 of the airbag 15 folded in this manner with the right portion laid out flat.) The two strips 16, 21 (FIG. 3F) abut on the center line A. After this first step, the airbag 15 is folded into an elongated shape 18, comprising the first strip 16 and the second strip 21.

In the second step (FIG. 3B), the first half 19 is folded along a line C which is perpendicular to the previous fold, beyond the gas generator 9 so that the new fold line C is situated approximately at the end of the short parallel housing wall 12. In the third step illustrated in FIG. 3C, the half 19 is folded back on itself toward the gas generator 9 along the line D, in such a manner that the distance between the fold line D and a second center line B of the housing 10 corresponds approximately to the width b of the elongated shape 18. The second center line B is substantially perpendicular on the first center line A.

In the fourth step, as illustrated in FIG. 3D, the half 19 is folded along a diagonal line E, which is situated such that an approximately right triangle is formed whose sides are substantially parallel to the center lines A, B. The folding line D extends to the edge of the half 19, forming point 20.

In the fifth step according to FIG. 3D, the half 19 is folded along a diagonal line F, which extends through the center M of the housing 10, in such a manner that the point 20 is positioned opposite recess 8 and projects beyond it. In the sixth step shown in FIG. 3F, the folding of the first half 19 is concluded by bending the point 20 downward out of the previous folding plane so that it is no longer visible and is fitted into the recess 8.

Subsequently, the second half 21 (FIG. 3F) of the elongated shape is folded analogously to the first half 19, so that finally the end condition is obtained which is illustrated in FIG. 3G. This arrangement is distinguished by the fact that the folded airbag 15—viewed in the folding plane—has assumed an approximately rhombic stowage shape, with the points of the rhombus positioned adjacent the recesses 8. The two halves 19, 21 of the elongated shape adjoin one another in their folding lines F, which extend approximately in parallel to one of the diagonally extending housing walls 13, 14. The portion of the airbag 15 which is situated in the folding plane has an essentially constant thickness over the whole surface.

Finally, to complete the impact body 3, a housing cover (not shown) is mounted on the housing 10, which closes off the housing 10 and holds the folded airbag 15 in its stowed position.

The airbag 15 now has the following stowage shape which is illustrated in FIG. 3G: it is folded together to form an elongated shape 18 parallel to the housing walls 11, 12, which is in two halves, each comprising in a lower stowage plane the fold C within the shorter of the two parallel housing walls 12 and at a right angle to the parallel housing walls 11, 12, and in an upper stowage plane centrally the diagonal fold F which extends approximately through the center M of the housing such that the point 20 lies over the recesses 8, in which case the sides of the triangle forming the point 20 are, on the one hand, formed by the fold E and, on the other hand, by the fold D and the edge of the half 19.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for folding a vehicle airbag to be stowed in a housing having a centrally located inflating device 9 and recesses which are adjacent to diagonally extending side walls of said housing, said process comprising the steps of:

folding first and second halves of said airbag back on themselves in an accordion shape, whereby an elongated shape is formed;

folding said elongated shape along diagonally extending fold lines to form points adjacent said recesses; and fitting said points into said recesses.

2. Process according to claim 1 wherein said second folding step comprises:

folding said elongated shape along first diagonal fold lines to form substantially v-shaped projections which terminate in said points; and folding said projections back on themselves along second diagonal fold lines so that said points are positioned adjacent said recesses.

3. Process according to claim 2 wherein said points extend beyond an outer perimeter of said housing after said second folding step.

4. Process according to claim 3 wherein said fitting step comprises folding said points out of a plane of said elongated shape so that said points project into said recesses when said airbag is stowed in said housing.

5. A vehicle airbag for stowage in a housing having a centrally located inflating device and recesses which are adjacent to diagonally extending side walls of said housing, wherein said airbag has first and second halves folded back on themselves in an accordion shape, said first and second halves forming an elongated portion;

said elongated portion has first folds along first diagonal lines and substantially v-shaped projections which terminate in points, said first diagonal lines forming one side of said v-shaped projections;

said v-shaped projections being folded back on themselves along second diagonal fold lines so that said points are positioned at a location corresponding to said recesses and extend beyond a perimeter of said housing.

6. A vehicle airbag arrangement folded for stowage in a housing having first and second parallel walls, said first wall being shorter than said second wall, said airbag having a first series of folds parallel to said first and second walls providing an elongated folded arrangement;

said elongated folded arrangement having a second fold along a line which is substantially perpendicular to said first series of folds at a point within an extremity of said first wall;

said elongated folded arrangement having a third fold which extends diagonally across said elongated folded arrangement, and a fourth fold which extends diagonally approximately through a center point of said folded housing, whereby a pointed projection of said folded airbag occupies a position which corresponds to a recess of said airbag, sides of said pointed projection being comprised by said third fold and by an edge of said elongated folded arrangement.

7. Apparatus for protecting an occupant of a vehicle, comprising:

a housing having an opening facing a passenger space of said vehicle, a centrally located inflating device and recesses which are adjacent to diagonally extending side walls of said housing; and an airbag having diagonal folds therein forming v-shaped projections having pointed end portions with dimensions which exceed dimensions of said housing;

said airbag being arranged in said housing with said pointed end portions adjacent to and folded into said recesses.

* * * * *